United States Patent
Kemnitz

(10) Patent No.: US 8,205,591 B2
(45) Date of Patent: Jun. 26, 2012

(54) PISTON FOR AN INTERNAL COMBUSTION ENGINE

(75) Inventor: Peter Kemnitz, Leutenbach (DE)

(73) Assignee: MAHLE International GmbH, Stuttgart (DE)

( * ) Notice: Subject to any disclaimer, the term of this patent is extended or adjusted under 35 U.S.C. 154(b) by 466 days.

(21) Appl. No.: 12/312,619

(22) PCT Filed: Oct. 23, 2007

(86) PCT No.: PCT/DE2007/001903
§ 371 (c)(1),
(2), (4) Date: Jun. 17, 2006

(87) PCT Pub. No.: WO2008/061487
PCT Pub. Date: May 29, 2008

(65) Prior Publication Data
US 2010/0012073 A1 Jan. 21, 2010

(30) Foreign Application Priority Data
Nov. 25, 2006 (DE) .......................... 10 2006 055 726

(51) Int. Cl.
*F02F 3/00* (2006.01)

(52) U.S. Cl. .................................................. 123/193.6
(58) Field of Classification Search ............... 123/193.6; 92/187
See application file for complete search history.

(56) References Cited

U.S. PATENT DOCUMENTS

| 4,124,010 A * | 11/1978 | Fiedler ........................ 123/193.6 |
| 4,359,973 A | 11/1982 | Shimada |
| 4,796,517 A * | 1/1989 | Akao et al. ....................... 92/187 |
| 5,327,813 A * | 7/1994 | DeBell et al. .................... 92/187 |
| 5,653,156 A | 8/1997 | Issler et al. |
| 7,107,893 B2 | 9/2006 | Weinkauf et al. |
| 7,647,863 B2 * | 1/2010 | Issler et al. ....................... 92/187 |
| 2007/0204746 A1 | 9/2007 | Issler et al. |
| 2008/0223211 A1 | 9/2008 | Maier et al. |
| 2008/0307957 A1 | 12/2008 | Kamp |

FOREIGN PATENT DOCUMENTS
DE 21 52 462 4/1973
(Continued)

OTHER PUBLICATIONS
International Search Report May 29, 2008.

*Primary Examiner* — M. McMahon
(74) *Attorney, Agent, or Firm* — Collard & Roe, P.C.

(57) ABSTRACT

The present invention relates to a piston (10) for an internal combustion engine having a piston head (11) and a piston skirt (16) with piston hubs (17) which are each connected to a hub bore (18) for receiving a piston bolt, wherein the piston hubs (17) are in the shape of a trapezoidal or step-shaped support in which the inner faces (19) of the piston hubs (17) include an acute angle ($\alpha a$) with the central axis (M) of the piston. The invention provides that each hub bore (18) is embodied as a shaped bore which is widened at least in its inner area in such a way that the widened portion increases in size in the direction of the inner end (18') of the hub bore (18) forming facets (120, 220) on the lateral surface (18) of the hub bore (18), and that the facets (120, 220) include an acute angle ($\alpha a$, $\beta$) with the central axis (M) of the piston.

5 Claims, 3 Drawing Sheets

FOREIGN PATENT DOCUMENTS

Figure 1:
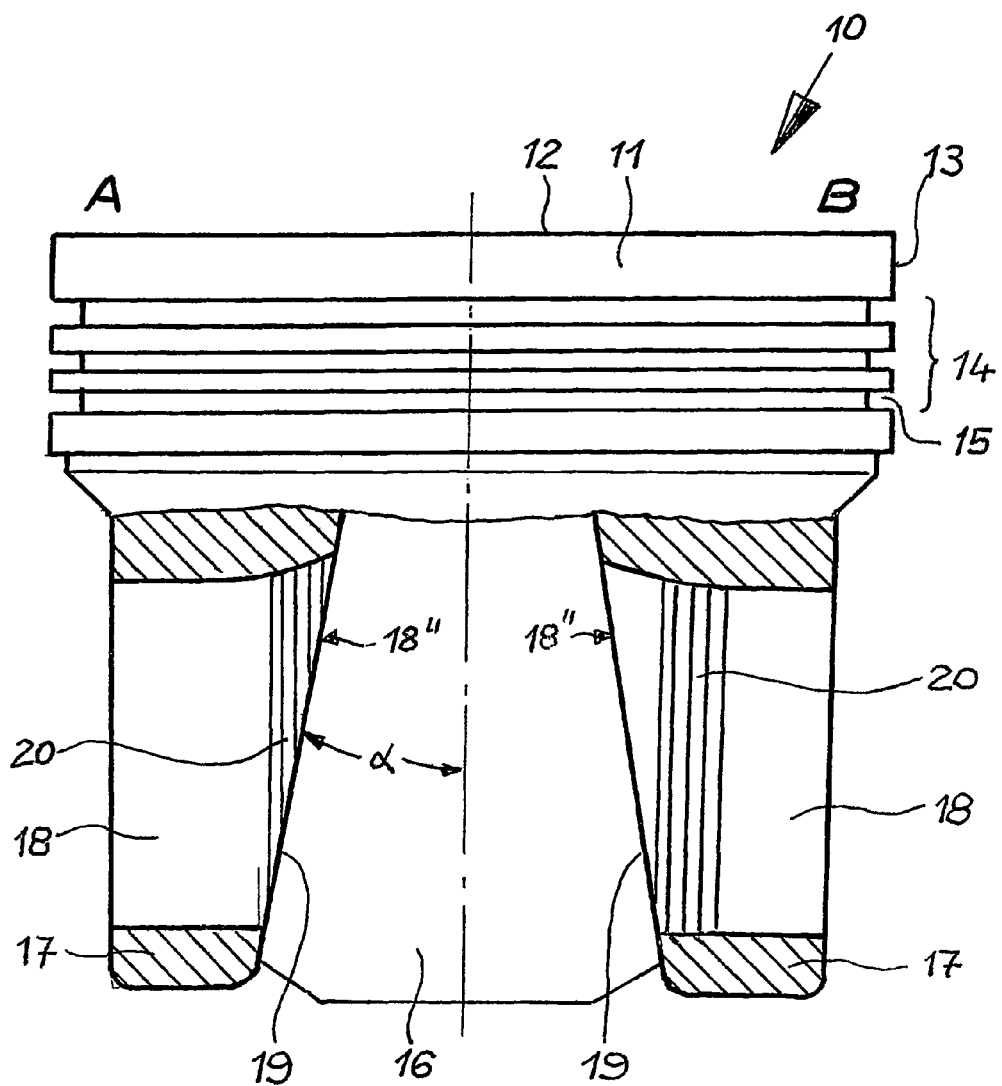

| | | |
|---|---|---|
| DE | 30 36 062 | 4/1982 |
| DE | 41 11 368 | 1/1992 |
| DE | 43 27 772 | 2/1995 |
| DE | 44 31 990 | 3/1996 |
| DE | 44 41 450 | 5/1996 |
| DE | 10 2004 008 097 | 9/2005 |
| DE | 10 2005 055 365 | 6/2006 |
| GB | 1 405 959 | 9/1975 |
| JP | 2001-295697 | 10/2001 |
| JP | 2004-028025 | 1/2004 |
| WO | WO 03/098078 | 11/2003 |
| WO | WO 2007/025733 | 3/2007 |

* cited by examiner

PISTON FOR AN INTERNAL COMBUSTION ENGINE

CROSS REFERENCE TO RELATED APPLICATIONS

This application is the National Stage of PCT/DE2007/001903 filed on Oct. 23, 2007, which claims priority under 35 U.S.C. §119 of German Application No. 10 2006 055 726.3 filed on Nov. 25, 2006. The international application under PCT article 21(2) was not published in English.

The present invention relates to a piston for an internal combustion engine, having a piston head and a piston skirt with integrated pin bosses, which are each provided with a pin bore for accommodating a piston pin, whereby the pin bosses have the shape of a trapezoid or step-shaped support, in which the inner surfaces of the pin bosses form an acute angle relative to the center axis of the piston.

A light-metal piston for high-stress internal combustion engines is known from DE 44 31 990 A1, in which the pin bosses are configured as so-called shaped bores, in order to avoid pin boss cracks, particularly as the result of bending of piston pins under great piston stress as the result of the ignition pressure. For this purpose, the pin bores are configured to be widened in the region of their ends, in order to extensively preclude friction and pressure stress between the piston pin and the pin bores.

In the case of a piston having a trapezoid connection (both with smooth and with step-shaped inner surfaces), such widening is problematic, since it is configured to be too slight in the lower region of the pin bore, and/or have an overly large and thus too coarse a step in the upper region of the pin bore. This can lead to very great strain at certain points between piston pin and pin bore, when the stress is very great and the piston is being bent significantly, so that pin boss cracks can occur despite the widening.

The present invention is based on the task of configuring a piston having a trapezoid connection (both with smooth and with step-shaped inner surfaces) in such a manner that even under great stress of the piston, no damage of either the piston pin or of the pin bore can occur.

To accomplish this task, a piston having the characteristics of claim 1 is proposed. According to the invention, it is provided that each pin bore is formed as a shaped bore, which is widened, at least in its inner region, in such a manner that the widening becomes larger in the direction of the inner end of the pin bore, forming facets on the mantle surface of the pin bore, and that the facets enclose an acute angle relative to the center axis of the piston.

The idea according to the invention consists thus in the fact that the facets that lead to the widening of the pin bore do not run parallel to the center axis of the piston, as is the case in DE 44 31 990 A1, for example. Instead, the facets run at an acute angle relative to the center axis of the piston, in other words "slanted" or "inclined" to a certain degree.

Such a formation of the pin bore of a piston, according to the invention, has the advantage that the piston pin, which bends during operation, under stress, rolls on the mantle surface of the pin bore both in the lower region of the pin bore, the nadir, and in the upper region of the pin bore, the zenith, area by area (in accordance with the width of the facets). The individual facets form pressure points on the mantle surface of the pin bore, on which the piston pin, which bends during operation, supports itself. In this connection, the individual pressure points follow one another with a relatively uniform distribution, while in the state of the art, the pressure points lie tightly spaced next to one another in the nadir of the pin bore, and actually lie on the inner edge of the pin bore in the most disadvantageous case, while an overly large step in the shaped bore occurs in the zenith. The configuration according to the invention makes it possible to give both the upper region and the lower region of the pin bore an optimal shape. This results in a uniform distribution of the stress forces that occur on the pin bore and the pin boss connection, and this prevents pin boss cracks, for example, to a great extent. Thus, the ability to withstand stress under the effect of inertia force is perceptibly improved.

Advantageous further developments are evident from the dependent claims.

The idea according to the invention is fulfilled both by facets that run parallel to the inner surface of the pin boss, and by facets that run in fan shape. In this connection, the configuration depends on the requirements of the individual case. Widening of the pin bore can therefore be configured individually, both in its lower region, in other words the nadir, and in its upper region, in other words the zenith, in accordance with the requirements, in each instance.

Another advantageous further development consists in that the widening can be configured both in step shape but also in constant manner. In the case of a constant progression, the widths of the individual facets are infinitesimally small. When the piston pin is bent, its surface will then roll continuously on the mantle surface of the pin bore. Thus, in the case of this configuration, an individual formation of the widening of the pin bore is possible.

Figure 3:
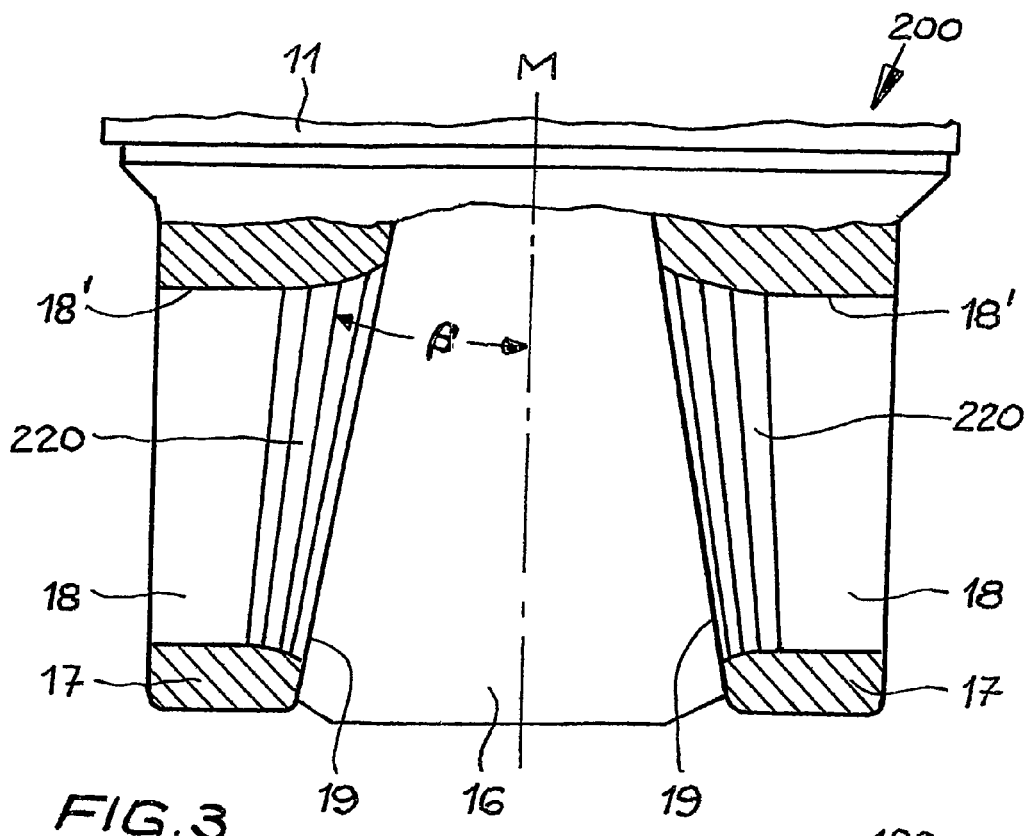
Figure 2:
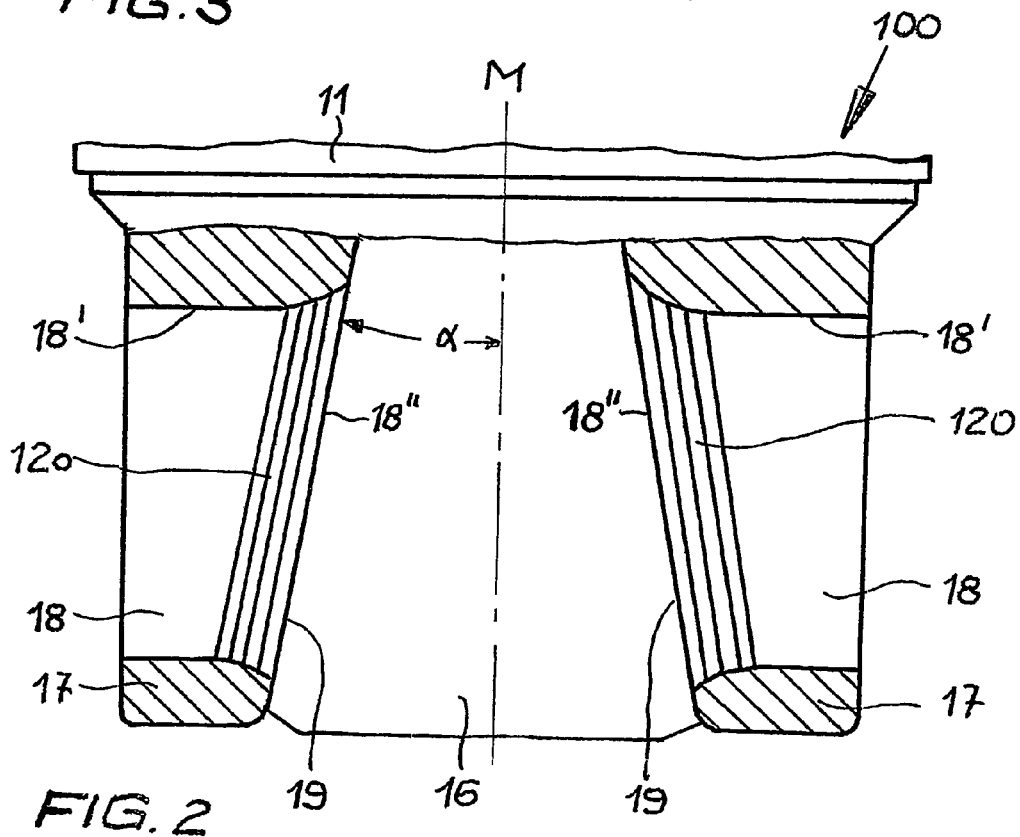
Figure 4:
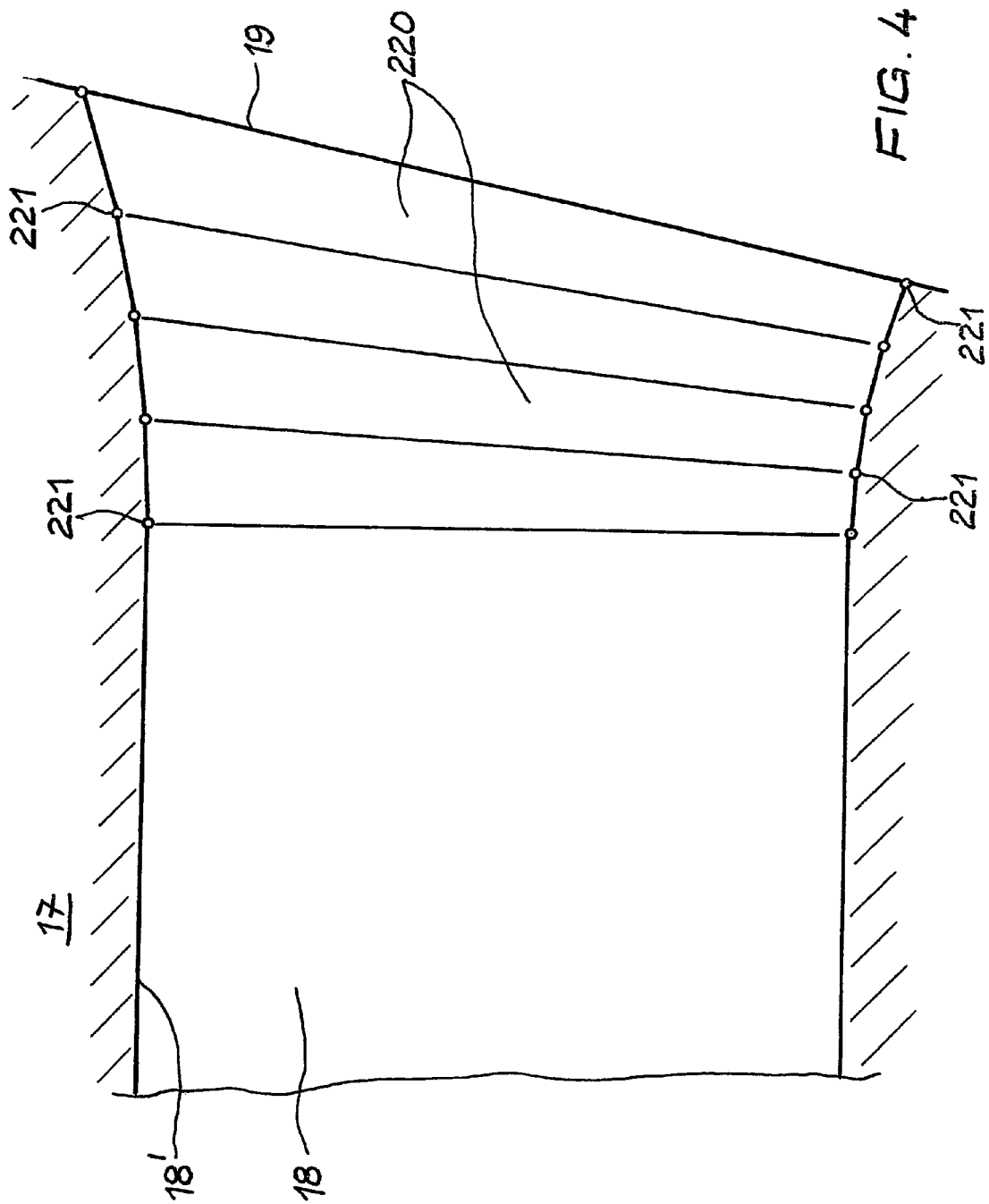

Exemplary embodiments of the present invention will be described in the following, using the attached drawings. These show, in a schematic representation, not true to scale:

FIG. 1 a piston according to the state of the art, in a frontal view, partly in section, whereby the left half shows a first variant A, and the right half shows a second variant B of the state of the art;

FIG. 2 an exemplary embodiment of a piston according to the invention, in a partial representation, in a frontal view, partly in section;

FIG. 3 another exemplary embodiment of a piston according to the invention, in a partial representation, partly in section;

FIG. 4 an enlarged representation of the arrangement and formation of the facets according to FIG. 3.

FIG. 1 shows a piston 10 according to the state of the art. The piston 10, which is a one-part piston in the exemplary embodiment, has a piston head 11 having a piston crown 12, a circumferential top land 13, and a circumferential ring belt 14 having ring grooves 15 for piston rings, not shown. Below the piston head 11, a piston skirt 16 as well as pin bosses 17 having pin bores 18 for accommodating a piston pin (not shown) are provided. The inner surfaces 19 of the pin bosses 17 enclose an acute angle α with the center axis M of the piston, and thus form a trapezoid support for a connecting rod (not shown). The pin bores 18 are configured as shaped bores, which widen in the direction of the inner ends 18" of the pin bores 18, in other words toward the center axis M of the piston, specifically forming facets 20 on the mantle surface 18' of the pin bores 18. The facets 20 run parallel to the center axis M of the piston. The piston 10 consists of any desired metallic material, for example steel or a light metal alloy. From Variant A according to the left half of FIG. 1, in which the upper part of the pin bosses 17 is provided with facets 20, the lower part of the pin bosses 17 does not demonstrate any facets. From Variant B according to the right half of FIG. 1, in which the lower part of the pin bosses 17 is provided with facets 20, the upper part of the pin bosses 17 demonstrates a step on the mantle surface 18' that is increased in size.

FIG. 2 shows a first exemplary embodiment of a piston 100 according to the invention, whereby components that are the same as in the generic piston 10, according to FIG. 1, have been provided with the same reference numbers. The piston 100 has fundamentally exactly the same structure as the piston 10, and is therefore only shown in part. The significant difference between the generic piston 10 and the piston 100 according to the invention consists in that in order to widen the pin bores 18, which are configured as shaped bores, facets 120 are formed along the mantle surface 18' of the pin bores 18, which facets run parallel to the inner surface 19 of the pin boss 17 and thus also parallel to one another, and enclose an acute angle α relative to the center axis M of the piston.

FIG. 3 shows a second exemplary embodiment of a piston 200 according to the invention, which has fundamentally the same structure as the piston 100 according to FIG. 2 that has already been described. In order to widen the pin bores 18, which are configured as shaped bores, facets 220 are formed along the mantle surface 18' of the pin bores 18, which facets run in fan shape, in other words the distance between the facets 220 in the nadir of the pin bores 18 is less than in the zenith of the pin bores 18. Thus, each facet 220 also encloses an acute angle relative to the center axis M of the piston. The amount of the angle is different for each facet 220. Therefore only one angle β is shown in FIG. 3, as an example.

FIG. 4 shows an enlarged detail representation of a pin bore 18 according to FIG. 3. In FIG. 4, it is clearly evident that the individual facets 220 on the mantle surface 18' of the pin bore 18 form pressure points 221, on which the piston pin, which bends during operation, supports itself on the mantle surface 18' of the pin bore 18. The individual pressure points 221 follow one another at approximately uniform intervals, in other words uniformly distributed. This means that the piston pin, which bends under stress during operation, rolls on the mantle surface 18' of the pin bore 18 both in the nadir and in the zenith of the pin bore 18, area by area (in accordance with the width of the facets). These thoughts, of course, also apply for facets 120 disposed parallel to the inner surface 19 of the pin boss 17, as shown in FIG. 2.

A comparison of the embodiments according to the invention according to FIGS. 2 to 4 with the representation according to FIG. 1 clearly shows that in the case of facets oriented parallel to the center axis M of the piston, a large step is formed in the zenith of the pin bores, while an edge is formed in the nadir, on which the piston pin supports itself at one point. In total, the facets in the zenith are disposed too far in the interior of the pin bore 18, and in the nadir, they are disposed too close to the inner end 18" of the pin bore 18. This means that the pin bore 18 is subject to extremely non-uniform stress due to the piston pin that bends during operation. In contrast, the configuration and arrangement of the facets 120, 220 according to the invention, at an acute angle relative to the center axis M of the piston, allows a uniform distribution of the facets over the pin bore 18, whereby this distribution can be very well adapted to individual requirements in the piston design. Thus, the forces that occur during operation are very uniformly distributed over the pin bore 18 and therefore over the entire pin boss 17, so that damage to the pin bore and the piston pin is avoided, to a great extent.

The widening of the pin bores 18 shown in the exemplary embodiments is always shown in step shape. Of course, the widening can also be formed in constant manner, whereby the widths of the individual facets become infinitesimally small. When the piston pin bends, its surface then rolls continuously on the mantle surface 18" of the pin bore 18.

The invention claimed is:

1. A piston (10) for an internal combustion engine, having a piston head (11) and a piston skirt (16) with pin bosses (17), which are each provided with a pin bore (18) for accommodating a piston pin, wherein the pin bosses (17) form a trapezoid-shaped support, in which inner surfaces (19) of the pin bosses (17) form an acute angle (α) relative to a center axis (M) of the piston, wherein each pin bore (18) is configured as a shaped bore that is widened at least in its inner region, in such a manner that the widening becomes larger in a direction of an inner end (18") of the pin bore (18), forming facets (120, 220) which run around the complete inner surface of the pin bore (18), and wherein the facets (120, 220) enclose an acute angle (α, β) relative to the center axis (M) of the piston.

2. The piston according to claim 1, wherein the facets (120) run parallel to the inner surface (19) of the pin boss (17).

3. The piston according to claim 1, wherein the facets (220) run in a fan shape.

4. The piston according claim 1, wherein the widening runs in a step-shaped manner.

5. The piston according to claim 1, wherein the widening runs in a constant manner.

* * * * *

UNITED STATES PATENT AND TRADEMARK OFFICE
CERTIFICATE OF CORRECTION

| | |
|---|---|
| PATENT NO. | : 8,205,591 B2 |
| APPLICATION NO. | : 12/312619 |
| DATED | : June 26, 2012 |
| INVENTOR(S) | : Kemnitz |

Page 1 of 1

It is certified that error appears in the above-identified patent and that said Letters Patent is hereby corrected as shown below:

In particular, on the cover page, Item [86] please change the § 371 (c)(1), (2), (4) Date from "June 17, 2006" to correctly read: --June 17, 2009--.

Signed and Sealed this
Twenty-second Day of January, 2013

David J. Kappos
*Director of the United States Patent and Trademark Office*